US007991648B2

(12) United States Patent
Sheehan et al.

(10) Patent No.: US 7,991,648 B2
(45) Date of Patent: Aug. 2, 2011

(54) OPPORTUNITY INDEX FOR IDENTIFYING A USER'S UNMET NEEDS

(75) Inventors: Megan Ann Sheehan, Redmond, WA (US); Rudolph W Struse, III, Lake Oswego, OR (US)

(73) Assignee: Microsoft Corporation, Redmond, WA (US)

( * ) Notice: Subject to any disclaimer, the term of this patent is extended or adjusted under 35 U.S.C. 154(b) by 898 days.

(21) Appl. No.: 11/927,718

(22) Filed: Oct. 30, 2007

(65) Prior Publication Data

US 2009/0112686 A1    Apr. 30, 2009

(51) Int. Cl.
*G06Q 30/00* (2006.01)
(52) U.S. Cl. .................................. 705/26.35; 705/7.11
(58) Field of Classification Search ........................ None
See application file for complete search history.

(56) References Cited

U.S. PATENT DOCUMENTS

| 6,236,975 | B1 | 5/2001 | Boe et al. |
|---|---|---|---|
| 6,574,621 | B1 | 6/2003 | Lautzenheiser et al. |
| 6,757,660 | B2 | 6/2004 | Canada et al. |
| 6,859,782 | B2 | 2/2005 | Harshaw |
| 7,054,827 | B1 | 5/2006 | Lautzenheiser et al. |
| 7,054,828 | B2 | 5/2006 | Heching et al. |
| 2001/0032107 | A1* | 10/2001 | Iwata et al. .......................... 705/7 |
| 2004/0068431 | A1 | 4/2004 | Smith et al. |
| 2004/0143477 | A1* | 7/2004 | Wolff .................................. 705/9 |
| 2005/0119931 | A1 | 6/2005 | Schall |
| 2006/0184372 | A1 | 8/2006 | Okada et al. |
| 2007/0168241 | A1* | 7/2007 | Robbins ............................ 705/7 |

OTHER PUBLICATIONS

Cheung, et al., "Mining customer product ratings for personalized marketing", Decision Support Systems , vol. 35 , Issue 2 , 2007, ACM, pp. 1-21.
Ulwick , "Outcome Based Segmentation" , 2002, Anthony W. Ulwick, pp. 1-13.
Ulwick , "The Innovation Equation" , 2002, Anthony W. Ulwick, pp. 7.
Ulwick , "The Strategic Role of Requirement in Innovation" , 2003, Anthony W. Ulwick, pp. 1-23.
Ulwick, "Accountable Innovation", 2002, Anthony W. Ulwick, pp. 1-16.

* cited by examiner

*Primary Examiner* — Asfand Sheikh
(74) *Attorney, Agent, or Firm* — Shook Hardy & Bacon LLP (57) ABSTRACT

An importance rating for a survey question is received from a respondent, wherein the survey question is associated with a product feature. A satisfaction rating for the survey question is received from the respondent. An opportunity index is computed for the survey question based on the importance rating and the satisfaction rating, wherein the opportunity index indicates respondent needs which are important to the respondent and not currently satisfied by the product feature. The opportunity index is then output.

17 Claims, 5 Drawing Sheets

FIG. 1

IMPORTANCE RATINGS

Here's a list of possible activities that relate to identifying and selecting a place that interests you. Please use the scale below to indicate how important each of these activities is when you conduct a search for this type of information. If you have never done or have not done a particular activity in the last 6 months, please select Not Applicable/Have not done.

| | NA/ Have Not Done | Not Important | | | | | | | | Extremely Important |
|---|---|---|---|---|---|---|---|---|---|---|
| FEATURE1 -Description  202 | 0 | 1 | 2 | 3 | 4 | 5 | 6 | 7 | 8 | 9 |
| FEATURE2 -Description  204 | 0 | 1 | 2 | 3 | 4 | 5 | 6 | 7 | 8 | 9 |

|  |  | SATISFACTION | | | | | | | | |
|---|---|---|---|---|---|---|---|---|---|---|
|  |  | 1 | 2 | 3 | 4 | 5 | 6 | 7 | 8 | 9 |
| IMPORTANCE | 1 | - | - | - | - | - | - | - | - | - |
|  | 2 | - | - | - | - | - | - | - | - | - |
|  | 3 | - | - | - | - | - | - | - | - | - |
|  | 4 | 37.5 | 31.3 | 25.0 | 18.8 | 12.5 | 6.3 | 0.0 | 0.0 | 0.0 |
|  | 5 | 50.0 | 41.7 | 33.3 | 25.0 | 16.7 | 8.3 | 0.0 | 0.0 | 0.0 |
|  | 6 | 62.5 | 52.1 | 41.7 | 31.3 | 20.8 | 10.4 | 0.0 | 0.0 | 0.0 |
|  | 7 | 75.0 | 62.5 | 50.0 | 37.5 | 25.0 | 12.5 | 0.0 | 0.0 | 0.0 |
|  | 8 | 87.5 | 72.9 | 58.3 | 43.8 | 29.2 | 14.6 | 0.0 | 0.0 | 0.0 |
|  | 9 | 100.0 | 83.3 | 66.7 | 50.0 | 33.3 | 16.7 | 0.0 | 0.0 | 0.0 |

OPPORTUNITY INDEX FOR IDENTIFYING A USER'S UNMET NEEDS

BACKGROUND

A company may conduct market research to discover the reaction of users to the company's products. For example, the company may give surveys to users to gather data. The survey data may then be analyzed to discover ways the company may change its product to further please users.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to an opportunity index for identifying a user's unmet needs. In embodiments herein, users may rate product features on importance and satisfaction. These ratings are then used to calculate an opportunity index that indicates user needs that are important to the user but not currently satisfied.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

As part of market research efforts to identify product development priorities, a company may conduct research into users' experiences with the company's products. Within this type of research, the goal is to identify key areas of unmet needs—user needs which are important to the user and not currently satisfied by the product. As used herein, the term product may also include service(s). For example, embodiments of the invention may be used by an appliance retailer to conduct research on its appliance installation services.

In embodiments herein, unmet user needs are expressed numerically using an opportunity index. Embodiments of the opportunity index have possible scores ranging from "0" to "100". This 0-100 scaling makes the opportunity index easy for human consumption. Zero implies there is no incremental value a company can bring to users with additional features/innovations directed at meeting that need and 100 indicates immense potential opportunity to bring value to users by satisfying users' current unmet need. By focusing product development efforts on the areas having a high opportunity index, a company may provide more value for users and differentiate its products, in meaningful ways, from competitors.

Figure 1:
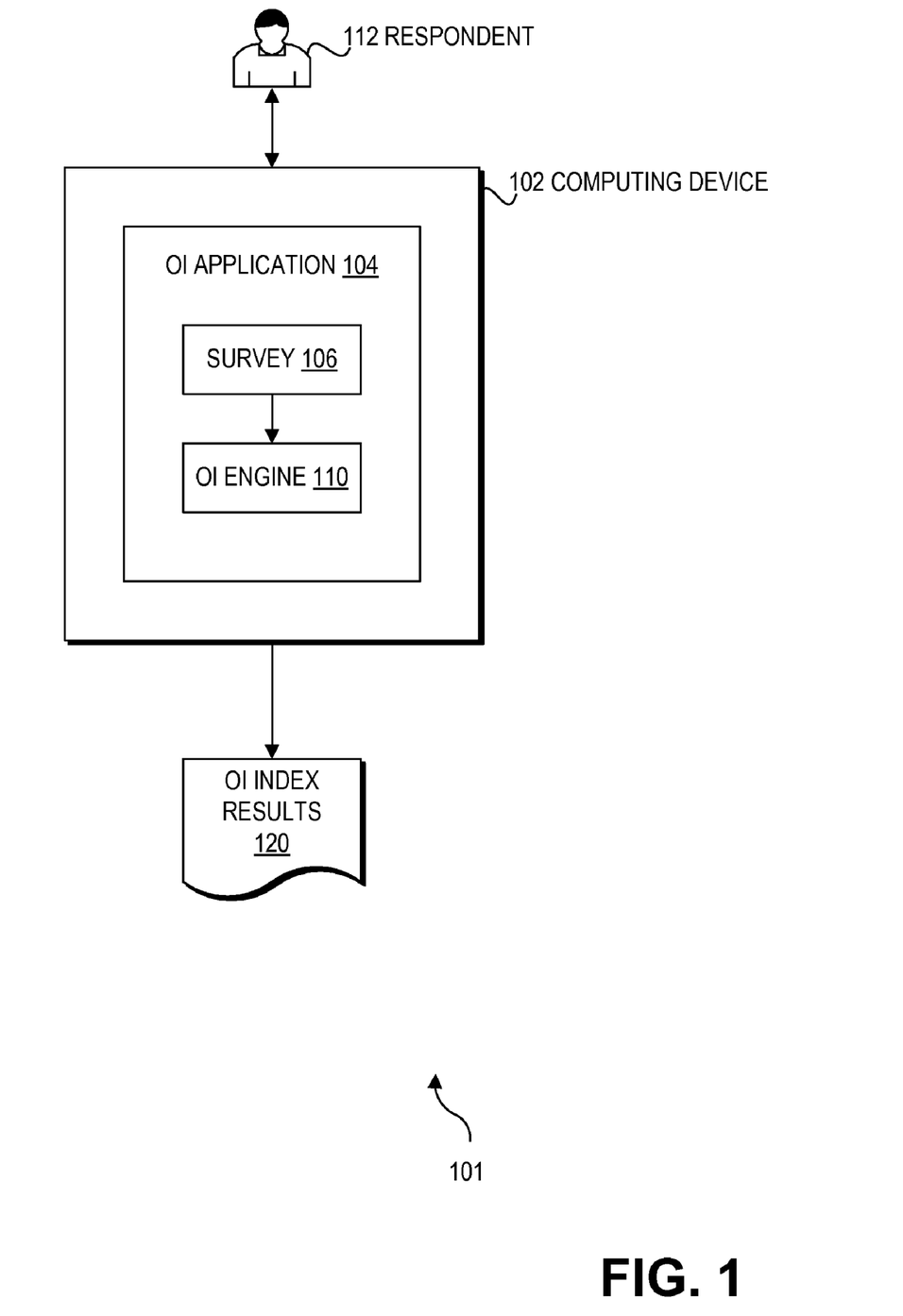
FIG. 1 is a block diagram of a computing environment for an opportunity index application in accordance with an embodiment of the invention.

FIG. 1 shows a computing environment 101 in accordance with an embodiment of the invention. Environment 101 includes a computing device 102. An example computing device is discussed below in conjunction with FIG. 5. Computing device 102 includes an Opportunity Index (OI) application 104. A respondent 112 (e.g., a product user) may interact with a survey presented by OI application 104. OI application 104 may compute an opportunity index based on the respondent's survey answers. In one embodiment, one or more components of OI application 104 may be implemented by computer readable instructions executable by one or more computing devices.

OI application 104 may include a survey module 106 and an OI engine 110. Survey module 106 may present a survey to respondent 112 and receive the respondent's answers to the survey questions. It will be appreciated that a survey question is not necessarily phrased as a question but may include a statement to which the user responds. Data collected by survey module 106 may be provided to OI engine 110 for computing an opportunity index based on the respondent's responses to the survey. OI application 104 may output OI index results 120. OI index results 120 may be stored on computing device 102, sent to another computing device connected to computing device 102 by a network, or sent to an output device such as a monitor, printer, and the like.

In one embodiment, computing environment 101 may be implemented using multiple computing devices. For example, client devices may execute OI application 104 for surveying multiple respondents and computing the opportunity indexes. Opportunity index data collected at each client device may be sent to a central computing device for aggregation and analysis. In one embodiment, OI application 104 may be executed on each client computing device using an Internet browser and send the resulting opportunity index data to a central Internet server.

In another embodiment, components of OI application 104 may be dispersed across multiple computing devices. For example, survey module 106 may be executed on multiple client computing devices. The survey data is sent to a central computing device that executes OI engine 110 to compute the opportunity index for each respondent.

In one embodiment, the survey includes two ratings for a survey question: importance and satisfaction. For example, the respondent may first be asked to rate how important a particular product feature is to the respondent. The respondent may then be asked to rate how satisfied they are with this particular feature. In one embodiment, if the importance rating is below a threshold, then the satisfaction rating is skipped for that particular feature. A survey question may address topics including, but not limited to, a current product feature, a need statement, user activity, and the like.

Figure 2:
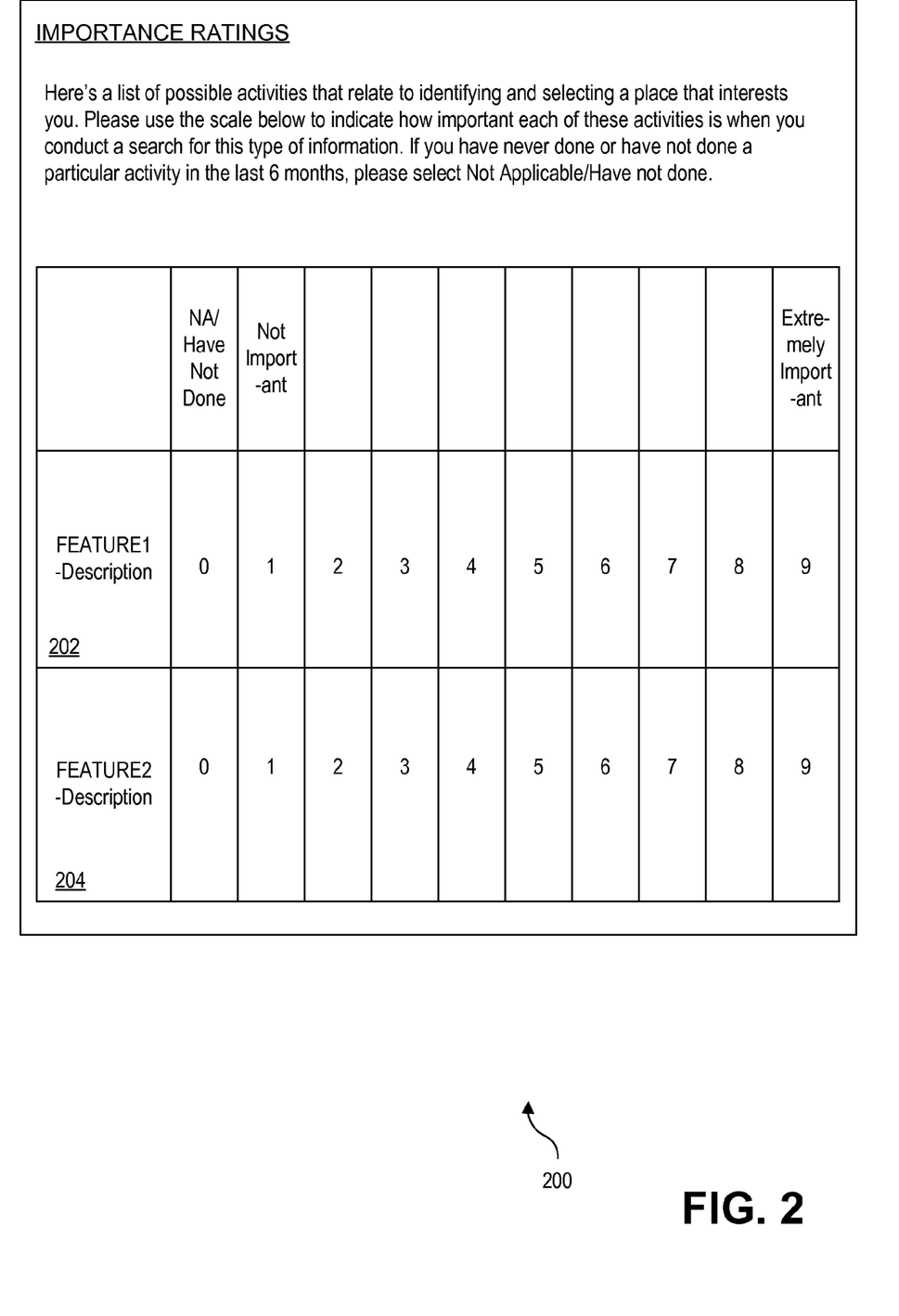
FIG. 2 is an example survey in accordance with an embodiment of the invention.

Referring to FIG. 2, an example survey 200 is shown. Survey 200 is asking the respondent to provide an importance rating for product feature1 (shown at 202) and product feature2 (shown at 204). The respondent rates each feature on an integer scale of 1 to 9, where a 1 rating is the low (Not Important) and a 9 rating is the high (Extremely Important). The survey may also include a rating of 0 for rating the feature as "Not Applicable" or "Not have done/used." The respondent may also be asked to rate their satisfaction with product features1 and 2 when their importance rating is above a threshold. In one embodiment, survey questions are presented to respondents in a randomized order to prevent "order effects" that may influence the survey results.

It will be appreciated that a product may have various product features. For example, a drink product may have features such as taste, color, bottle shape, etc., that may be surveyed. Using the example in FIG. 2, product feature1 may be associated with the drink taste and product feature2 may be associated with the drink color.

Embodiments of the opportunity index algorithm are based on a broad scale for importance and satisfaction ratings (e.g., scale of 1-9 as opposed to 1-5) in order to avoid range restriction and provide better data for analysis based on correlation matrices (e.g., correlation, cluster analysis, confirmatory and exploratory factor analysis, etc.). For example, from previous testing, importance and satisfaction ratings based on a 1-5 scale resulted in range restriction and multi-colinearity among the variables.

Figure 3:
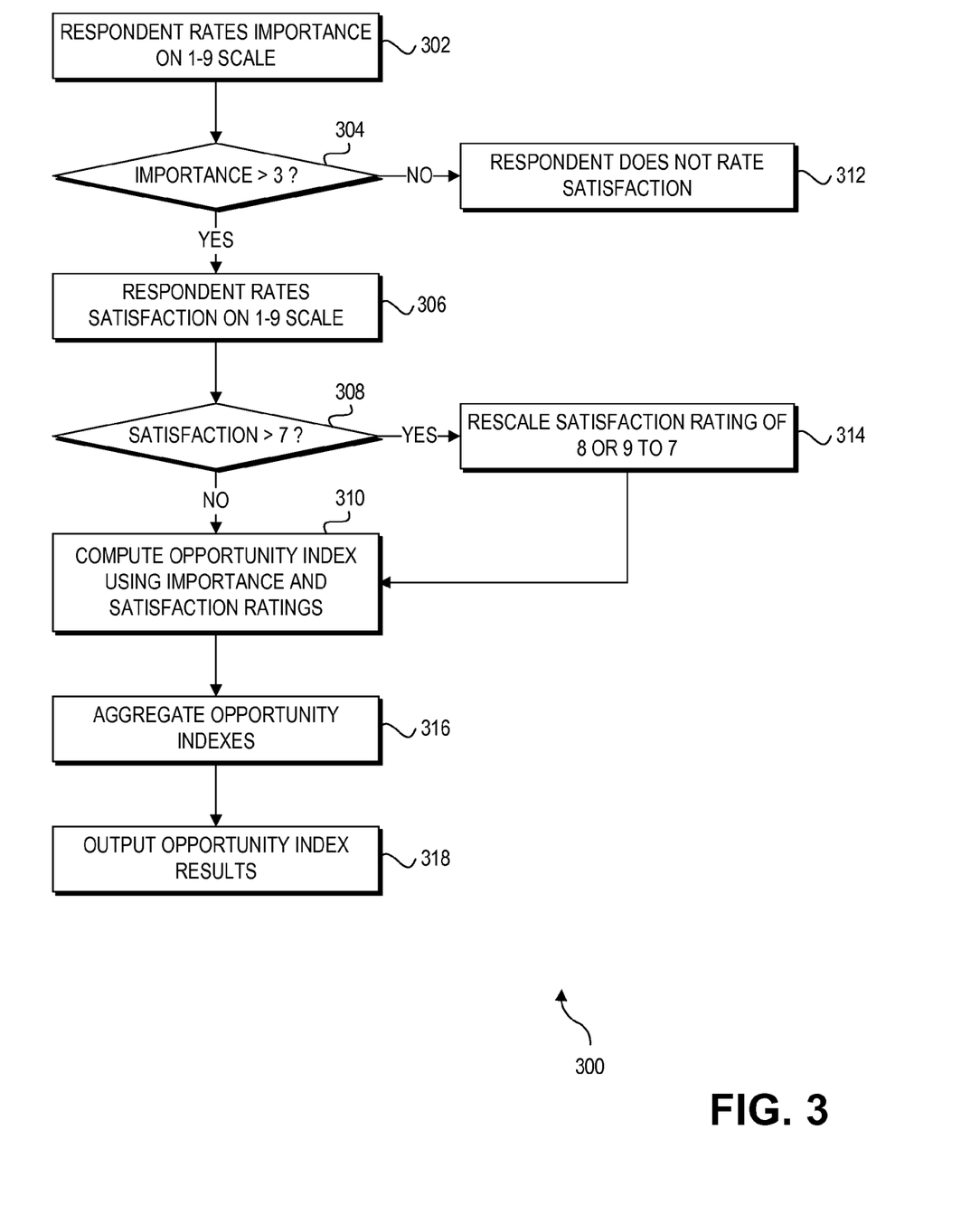
FIG. 3 is a flowchart showing operations of computing an opportunity index in accordance with an embodiment of the invention.

Turning to FIG. 3, a flowchart 300 shows operations of computing an opportunity index in accordance with an embodiment of the invention. In one embodiment, at least a portion of flowchart 300 may be implemented by computer readable instructions executable by one or more computing devices. In one embodiment, the operations of flowchart 300 may be conducted by OI application 104. While flowchart 300 shows operations for computing the opportunity index for a single survey question, it will be appreciated that the logic of flowchart 300 may be repeated for each survey question.

Starting with operation 302, a respondent rates importance of a survey question (e.g., on a scale of 1-9). Next, in operation 304, the logic determines if importance has been rated above an importance threshold (e.g., above a 3 rating). If the answer is no, then the logic proceeds to operation 312 where the respondent does not rate satisfaction. After operation 312, the logic moves to the next survey question and flowchart 300 restarts at operation 302.

In one embodiment, to help address the survey length challenges typical in market research and to lessen the burden on respondents, respondents only rate a survey question on satisfaction if they rate the importance at 4 thru 9. If the respondent has no experience with the survey question (e.g., using a product feature), then the respondent does not rate importance or satisfaction. If the respondent rates the importance as 1-3, then survey question topic is of low importance to the respondent. Since a company would probably not be able to develop a strong value proposition by addressing this survey question topic, the survey does not measure the respondent's satisfaction with the survey question. Only respondents who rate both importance and satisfaction for a survey question are included in the opportunity score calculations for that survey question.

By limiting the base of respondents in the opportunity index, the opportunity score is based on respondents who are engaged in a particular activity, assign a reasonable minimum assessment of its importance to their life, and are able to rate their satisfaction with their current experience. However, given this base, the opportunity index is limited in that it only represents individuals who currently have experience with an activity, which may downplay activities that are more forward-looking or futuristic. Therefore, a company may wish to consider other inputs when planning new products/services.

At operation 304, if the respondent rated importance above the importance threshold (e.g., above a 3 rating), then the logic proceeds to operation 306 where the respondent rates satisfaction for the survey question (e.g., rates satisfaction on a 1-9 scale).

Next, in operation 308, the logic determines if the respondent rated satisfaction at a rating above a satisfaction threshold (e.g., a satisfaction rating above a 7 rating). If the answer is yes, then the logic proceeds to operation 314 to rescale the satisfaction rating to a lower rating (e.g., rescale a satisfaction rating of 8 or 9 to a rating of 7). Next, the logic proceeds to operation 310 (discussed below).

When a respondent rates satisfaction above the satisfaction threshold (e.g., rating of 8 or 9), the respondent is reasonably satisfied and there is little opportunity to improve on that level of satisfaction. In fact, a company might inadvertently cause dissatisfaction among users by changing a product feature that is already highly satisfying to users.

In operation 308, if the respondent's satisfaction rating is not above the satisfaction threshold (e.g., at or below a 7 rating), then the logic proceeds to operation 310. At operation 310, an opportunity index for the survey question is computed using the importance and satisfaction ratings. In one embodiment, the opportunity index is computed by the following: ((importance rating−1)×1.25)×((7−satisfaction rating)×1.6667), where importance rating and satisfaction rating are on a scale from 1-9, where 1 is a low rating and 9 is a high rating.

In the above opportunity index equation, in order to achieve the intuitive 0 to 100 opportunity index, one is subtracted from the importance rating and then the importance rating is multiplied by 1.25 (in order to have the 0 to 10 range). The satisfaction rating (which may have been rescaled from an 8 or 9 to a 7) is subtracted from 7 and multiplied by 1.6667 (again to have the 0 to 10 range). It will be appreciated that the opportunity index calculation is bound to individual level scores and not bound to a percentage of the total sample. This makes it possible to identify differences among individual respondents within the survey results.

Next, in operation 316, opportunity indexes may be aggregated in various ways. Opportunity indexes are calculated at an individual level for each survey question. In one embodiment, the opportunity index score for a survey question may be aggregated across multiple opportunity indexes for multiple respondents and the mean computed. The mean opportunity index may be reported for the total sample as well as sub-groups within the sample based on profiling variables, such as age, gender, income, job role, company size, current product used, etc.

Next, in operation 318, the opportunity index results are outputted. It will be appreciated that opportunity index results from multiple survey questions may be collected and reported together. The opportunity index results may be reported in various ways, such as per individual respondent, as a mean per survey question, as a mean per survey question within a sub-group, and the like. The opportunity index results may be output to a storage device or output to an output device of a computing device.

Figure 4:
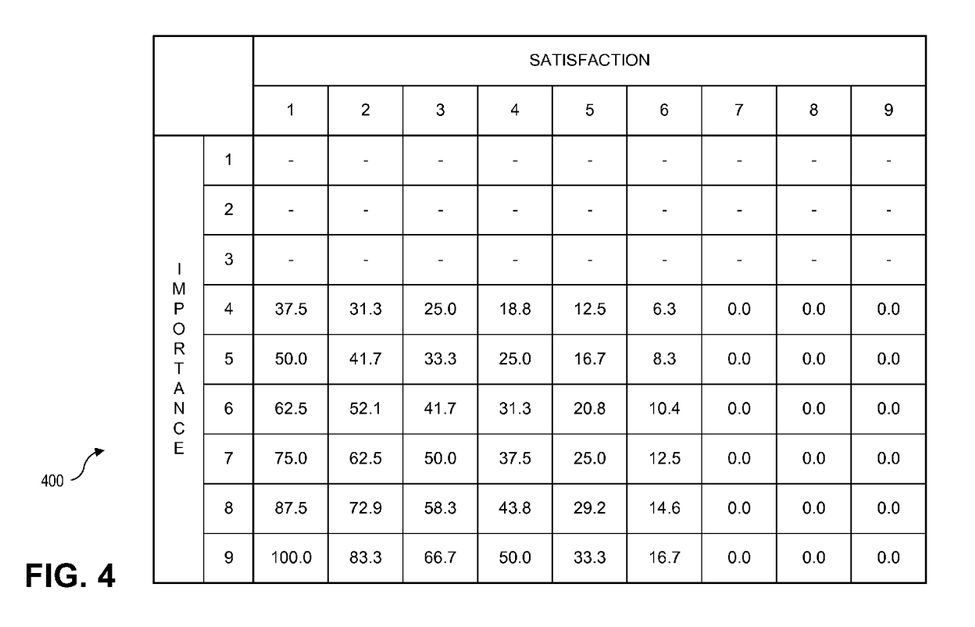
FIG. 4 is a table of opportunity index ranges in accordance with an embodiment of the invention.

Turning to FIG. 4, a table 400 of opportunity index ranges in accordance with an embodiment of the invention is shown. Table 400 shows the range of scores that may be achieved for each combination of importance and satisfaction ratings. For example, if a respondent rates a survey question a 7 in importance and a 6 in satisfaction, the associated opportunity index would be 12.5. In one embodiment, an opportunity index is calculated for each survey question for each individual respondent, then averaged across the entire sample (for whom there is importance and satisfaction data) for reporting purposes. While theoretically a score of 100 is possible, it would be nearly impossible to achieve a 100 on an aggregate basis. Most aggregate scores for each survey question fall below a "30" in practice.

Embodiments of the invention are directed to an opportunity index for identifying users' unmet needs with a product. A broad rating scale (e.g., 1-9) and ability to calculate an opportunity index on an individual user level provides highly granular data for reporting and analysis. Embodiments of the invention may dynamically reduce survey length as a user takes a survey thus preventing unreasonable survey lengths that may result in poor data quality.

Figure 5:
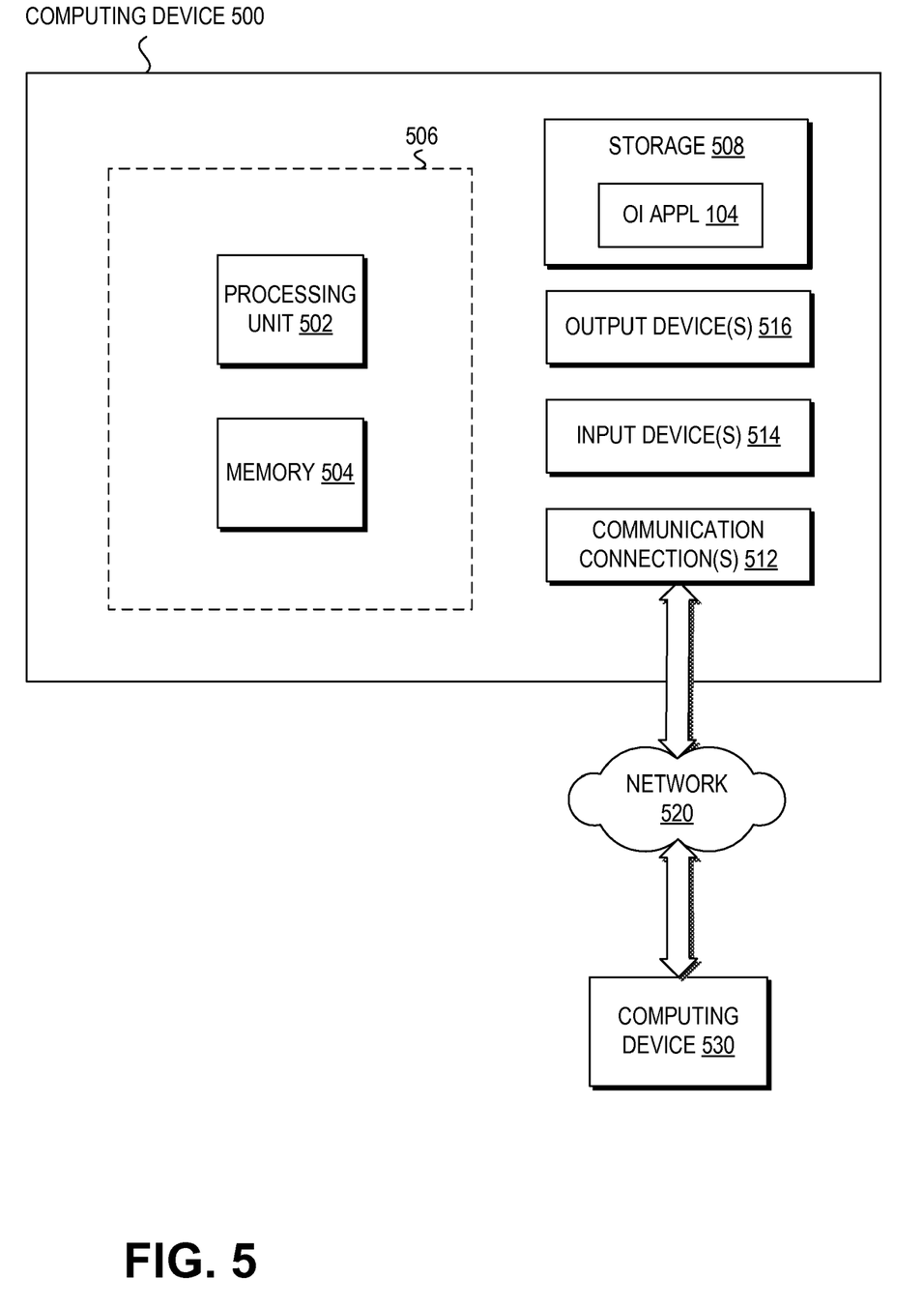
FIG. 5 is a block diagram of an example computing device for implementing embodiments of the invention.

FIG. 5 and the following discussion provide a brief, general description of a suitable computing environment to implement embodiments of the invention. The operating environment of FIG. 5 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 shows an example of a computing device 500 for implementing one or more embodiments of the invention. In one configuration, computing device 500 includes at least one processing unit 502 and memory 504. Depending on the exact configuration and type of computing device, memory 504 may be volatile (such as RAM), non-volatile (such as ROM, flash memory, etc.) or some combination of the two. This configuration is illustrated in FIG. 5 by dashed line 506.

In other embodiments, device 500 may include additional features and/or functionality. For example, device 500 may also include additional storage (e.g., removable and/or non-removable) including, but not limited to, magnetic storage, optical storage, and the like. Such additional storage is illustrated in FIG. 5 by storage 508. In one embodiment, computer readable instructions to implement embodiments of the invention may be in storage 508. For example, computer readable instructions to implement OI application 104 may be stored in storage 508 and loaded in memory 504 for execution by processing unit 502. Storage 508 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 504 and storage 508 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 500. Any such computer storage media may be part of device 500.

Device 500 may also include communication connection(s) 512 that allow device 500 to communicate with other devices. Communication connection(s) 512 may include, but is not limited to, a modem, a Network Interface Card (NIC), an integrated network interface, a radio frequency transmitter/receiver, an infrared port, a USB connection, or other interfaces for connecting computing device 500 to other computing devices. Communication connection(s) 512 may include a wired connection or a wireless connection. Communication connection(s) 512 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 500 may include input device(s) 514 such as keyboard, mouse, pen, voice input device, touch input device, infrared cameras, video input devices, and/or any other input device. Output device(s) 516 such as one or more displays, speakers, printers, and/or any other output device may also be included in device 500. Input device(s) 514 and output device(s) 516 may be connected to device 500 via a wired connection, wireless connection, or any combination thereof. In one embodiment, an input device or an output device from another computing device may be used as input device(s) 514 or output device(s) 516 for computing device 500.

Components of computing device 500 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 500 may be interconnected by a network. For example, memory 504 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 530 accessible via network 520 may store computer readable instructions to implement one or more embodiments of the invention. Computing device 500 may access computing device 530 and download a part or all of the computer readable instructions for execution. Alternatively, computing device 500 may download pieces of the computer readable instructions, as needed, or some instructions may be executed at computing device 500 and some at computing device 530. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. One or more non-transitory computer-readable media storing computer-executable instructions thereon for performing a method, the method comprising:
   receiving an importance rating, on an integer scale of 1 to 9, for a survey question from a respondent, wherein the survey question is associated with a product feature;
   receiving a satisfaction rating, on an integer scale of 1 to 9, for the survey question from the respondent;
   computing an opportunity index for the survey question based on the importance rating and the satisfaction rating, wherein the opportunity index indicates respondent needs which are important to the respondent and not currently satisfied by the product feature, and wherein the opportunity index is computed by ((importance rating$-1$)$\times 1.25$)$\times$((7$-$satisfaction rating)$\times 1.6667$); and
   outputting the opportunity index.

2. The media of claim 1, wherein the satisfaction rating is received when the importance rating exceeds an importance threshold.

3. The media of claim 2, wherein the importance threshold is a 3.

4. The media of claim 1, further comprising:
   rescaling the satisfaction rating when the satisfaction rating exceeds a satisfaction threshold.

5. The media of claim 4, wherein the satisfaction threshold is a 7.

6. The media of claim 5, wherein the satisfaction rating is rescaled to a rating of 7.

7. The media of claim 1, further comprising:
   aggregating the opportunity index for the respondent with a plurality of opportunity indices computed for the survey question for a plurality of respondents; and
   computing a mean opportunity index from the aggregated opportunity indices.

8. The media of claim 7, further comprising:
   computing a mean opportunity index for a sub-group within the aggregated opportunity indices.

9. One or more non-transitory computer-readable media storing computer-executable instructions that, when executed, perform a method, the method comprising:
   receiving an importance rating, on an integer scale of 1 to 9, for a survey question from a respondent, wherein the survey question is associated with a product feature;
   upon determining that the received importance rating exceeds an importance threshold, receiving a satisfaction rating, on an integer scale of 1 to 9, for the survey question from the respondent;
   computing an opportunity index on a scale of 0 to 100 for the survey question based on the importance rating and the satisfaction rating, wherein the opportunity index indicates respondent needs which are important to the respondent and not currently satisfied by the product feature, and wherein the opportunity index is computed by ((importance rating $-1$)$\times 1.25$)$\times$((7-satisfaction rating)$\times 1.6667$); and
   outputting the opportunity index.

10. The media of claim 9, wherein the importance threshold is 3.

11. The media of claim 10, further comprising:
    rescaling the satisfaction rating when the satisfaction rating exceeds a satisfaction rating of a 7.

12. The media of claim 11, wherein the satisfaction rating is rescaled to a rating of 7.

13. The media of claim 9, further comprising:
    aggregating the opportunity index for the respondent with a plurality of opportunity indices computed for the survey question for a plurality of respondents; and
    computing a mean opportunity index from the aggregated opportunity indices.

14. The media of claim 13, further comprising:
    computing a mean opportunity index for a sub-group within the aggregated opportunity indices.

15. One or more non-transitory computer-readable media storing computer-executable instructions thereon for performing a method for identifying a user need which is important to a user and not currently satisfied by a product feature, the method comprising:
    receiving, from the user, an importance rating on an integer scale of 1 to 9 to a survey question associated with the product feature;
    receiving, from the user, a satisfaction rating on an integer scale of 1 to 9 to the survey question;
    computing an opportunity index on a scale of 0 to 100 for the survey question based on the importance rating and the satisfaction rating, wherein the opportunity index is computed by ((importance rating$-1$)$\times 1.25$)$\times$((7$-$satisfaction rating)$\times 1.6667$);
    outputting the opportunity index;
    receiving a plurality of opportunity indices computed based on a corresponding plurality of users' importance and satisfaction ratings to the survey question;

aggregating the opportunity index for the user and the received plurality of opportunity indices; and computing a mean opportunity index from the aggregated opportunity indices.

16. The media of claim 15 wherein the satisfaction rating is received when the importance rating exceeds an importance rating of a 3, and wherein the opportunity index is not computed when the satisfaction rating is not received.

17. The media of claim 15, further comprising:

rescaling the satisfaction rating to a 7 prior to computing the opportunity index when the satisfaction rating exceeds a satisfaction rating of 7.

\* \* \* \* \*

UNITED STATES PATENT AND TRADEMARK OFFICE
CERTIFICATE OF CORRECTION

| | | |
|---|---|---|
| PATENT NO. | : 7,991,648 B2 | Page 1 of 1 |
| APPLICATION NO. | : 11/927718 | |
| DATED | : August 2, 2011 | |
| INVENTOR(S) | : Megan Ann Sheehan et al. | |

It is certified that error appears in the above-identified patent and that said Letters Patent is hereby corrected as shown below:

In column 7, line 64, in Claim 4, delete "resealing" and insert -- rescaling --, therefor.

In column 8, line 2, in Claim 6, delete "resealed" and insert -- rescaled --, therefor.

In column 8, line 29, in Claim 9, delete "rating -1)" and insert -- rating-1) --, therefor.

Signed and Sealed this
Twenty-fifth Day of October, 2011

David J. Kappos
*Director of the United States Patent and Trademark Office*